US012656460B2

(12) United States Patent
Yamada

(10) Patent No.: US 12,656,460 B2
(45) Date of Patent: Jun. 16, 2026

(54) DISTANCE MEASUREMENT DEVICE

(71) Applicant: SONY SEMICONDUCTOR SOLUTIONS CORPORATION, Kanagawa (JP)

(72) Inventor: Satoshi Yamada, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 906 days.

(21) Appl. No.: 17/918,474

(22) PCT Filed: Apr. 14, 2021

(86) PCT No.: PCT/JP2021/015370
§ 371 (c)(1),
(2) Date: Oct. 12, 2022

(87) PCT Pub. No.: WO2021/215314
PCT Pub. Date: Oct. 28, 2021

(65) Prior Publication Data
US 2023/0145578 A1      May 11, 2023

(30) Foreign Application Priority Data

Apr. 24, 2020      (JP) ................................. 2020-077489

(51) Int. Cl.
*G01S 7/48*      (2006.01)
*G01S 7/481*      (2006.01)
*G01S 17/08*      (2006.01)
(52) U.S. Cl.
CPC .......... *G01S 7/4808* (2013.01); *G01S 7/4816* (2013.01); *G01S 17/08* (2013.01)

(58) Field of Classification Search
CPC ...... G01S 7/4808; G01S 7/4816; G01S 17/08; G01S 17/88; G01S 17/36; G01S 7/481; G01S 17/894; G01S 17/931
See application file for complete search history.

(56) References Cited

U.S. PATENT DOCUMENTS 10,234,560 B2 *   3/2019   Van Der Tempel .. G01S 7/4865
11,047,976 B2 *   6/2021   Sutou ...................... G01S 17/86

FOREIGN PATENT DOCUMENTS

JP      2006-085246 A      3/2006
JP      2017-173153 A      9/2017
(Continued)

OTHER PUBLICATIONS

International Search Report and Written Opinion of PCT Application No. PCT/JP2021/015370, issued on Jun. 29, 2021, 12 pages of ISRWO.

*Primary Examiner* — Seung C Sohn
(74) *Attorney, Agent, or Firm* — CHIP LAW GROUP

(57)      ABSTRACT

Provided is a distance measurement device capable of performing signal processing such as distance measurement with high speed and low power consumption.
A distance measurement device includes: a first semiconductor element including a first light-reception section that receives light and performs photoelectric conversion to generate an electric signal; a second semiconductor element including a distance calculation section that performs calculation of distance information regarding a distance to an object on the basis of the electric signal; and a third semiconductor element including a signal processing section that performs predetermined information processing on the basis of an output signal of the distance calculation section.

17 Claims, 10 Drawing Sheets

(56)     References Cited

FOREIGN PATENT DOCUMENTS

| | | | |
|---|---|---|---|
| JP | 2019-047486 | A | 3/2019 |
| JP | 2019-191119 | A | 10/2019 |
| WO | 2017/119098 | A1 | 7/2017 |
| WO | 2018/159289 | A1 | 9/2018 |
| WO | 2019/041267 | A1 | 3/2019 |
| WO | 2019/065174 | A1 | 4/2019 |

* cited by examiner

12: SECOND SEMICONDUCTOR ELEMENT

10: DISTANCE MEASUREMENT DEVICE

31

11

FIRST SEMICONDUCTOR ELEMENT

FIRST LIGHT-RECEPTION SECTION

11a

SECOND SEMICONDUCTOR ELEMENT

12

SIGNAL PROCESSING CIRCUIT

12a

32

8

MEMORY

12c

33

14

FOURTH SEMICONDUCTOR ELEMENT

SECOND LIGHT-RECEPTION SECTION

14a

FIRST SEMICONDUCTOR ELEMENT

11

FIRST LIGHT-RECEPTION SECTION

11a

SECOND SEMICONDUCTOR ELEMENT

12

SIGNAL PROCESSING CIRCUIT

12a

MEMORY

32

8

12c

DISTANCE MEASUREMENT DEVICE

CROSS REFERENCE TO RELATED APPLICATIONS

This application is a U.S. National Phase of International Patent Application No. PCT/JP2021/015370 filed on Apr. 14, 2021, which claims priority benefit of Japanese Patent Application No. JP 2020-077489 filed in the Japan Patent Office on Apr. 24, 2020. Each of the above-referenced applications is hereby incorporated herein by reference in its entirety.

TECHNICAL FIELD

The present disclosure relates to a distance measurement device.

BACKGROUND ART

For automated driving, face authentication, depth information detection and the like, the Time of Flight (ToF) method, which performs distance measurement in a contactless manner on the basis of the time of flight of light, is receiving attention. The ToF method includes a direct ToF method to directly measure the time of flight of pulsed optical signals and an indirect ToF method to indirectly measure a distance by using a phase difference between optical signals.

The direct ToF method is suitable for measuring a relatively long distance, while the indirect ToF method is suitable for measuring a short distance of several tens of cm or less. Recently, in an increasing number of cases, smartphones are provided with a sensor of the indirect ToF method for face recognition and acquiring depth information and the like.

The indirect ToF method involves more complicated signal processing than the direct ToF method, and often measures a distance by software processing. For example, in smartphones provided with a sensor of the indirect ToF method, it is typical that a signal processing processor (hereinafter, DSP: Digital Signal processor) performs distance measurement by software processing at an instruction from an application processor (AP).

CITATION LIST

Patent Document

Patent Document 1: Japanese Patent Application Laid-Open No. 2019-191119

SUMMARY OF THE INVENTION

Problems to be Solved by the Invention

However, a DSP provided to mobile devices such as smartphones has lower processing performance than a CPU for a personal computer (PC) or the like, and generates heat when performing signal processing with high load such as distance measurement processing. Mobile devices such as smartphones are provided with a temperature sensor, and when the temperature inside the enclosure rises too much, processing for relieving the processing load of the DSP by decreasing the frame rate is automatically performed. This causes a problem that it takes time for signal processing such as distance measurement.

Furthermore, performing signal processing such as distance measurement by software processing causes a problem of increase in power consumption. Mobile devices such as smartphones are driven by batteries, and increased power consumption lowers their usability.

Thus, the present disclosure provides a distance measurement device capable of performing signal processing such as distance measurement with high speed and low power consumption.

Solutions to Problems

In order to solve the problem described above, according to the present disclosure, a distance measurement device is provided, including:

a first semiconductor element including a first light-reception section that receives light and performs photoelectric conversion to generate an electric signal;

a second semiconductor element including a distance calculation section that performs calculation of distance information regarding a distance to an object on the basis of the electric signal; and a third semiconductor element including a signal processing section that performs predetermined information processing on the basis of an output signal of the distance calculation section.

The second semiconductor element may include a bypass circuit, and the signal processing section may perform the information processing on the electric signal output via the bypass circuit.

The bypass circuit may output the electric signal output from the first semiconductor element without performing processing at the distance calculation section.

The first semiconductor element may output the electric signal of multiple phases in which a phase difference changes with the distance to the object, and the distance calculation section may calculate the distance information on the basis of the electric signal of the multiple phases.

The distance calculation section may calculate the distance information from a time difference between a timing at which a light-emitting section emits light and a timing at which the first light-reception section receives light.

A light-emitting section that emits light in response to control from the first light-reception section may be included.

The first semiconductor element and the light-emitting section may be implemented on a same substrate.

A first substrate on which the first semiconductor element is implemented, and a second substrate on which the second semiconductor element is implemented are included, and the first substrate and the second substrate may be laminated on each other.

The first substrate and the second substrate may be laminated together by a Chip on Chip (CoC) method, a Chip on Wafer (CoW) method, or a Wafer on Wafer (WoW) method.

A memory implemented on the second substrate and used by the distance calculation section for performing the calculation of the distance information may be included.

A third substrate on which a memory used by the distance calculation section for performing the calculation of the distance information is implemented may be included, and the first substrate, the second substrate, and the third substrate may be laminated in a predetermined order.

The memory may be a volatile memory or a rewritable non-volatile memory.

The distance calculation section may include a digital circuit that performs digital signal processing on the electric signal including the calculation of the distance information.

A fourth semiconductor element including a second light-reception section that receives light and performs photoelectric conversion to generate an electric signal may be included.

An electric signal output from the second light-reception section may be input to the third semiconductor element without passing through the second semiconductor element.

The third semiconductor element may control whether or not to synchronize an electric signal output from the first light-reception section and an electric signal output from the second light-reception section.

The fourth semiconductor element may transmit, to the first semiconductor element and the second semiconductor element, a synchronization signal synchronized with an electric signal output from the second light-reception section.

The first light-reception section and the second light-reception section may receive light of respective different wavelength bands.

MODE FOR CARRYING OUT THE INVENTION

Figure 1A:
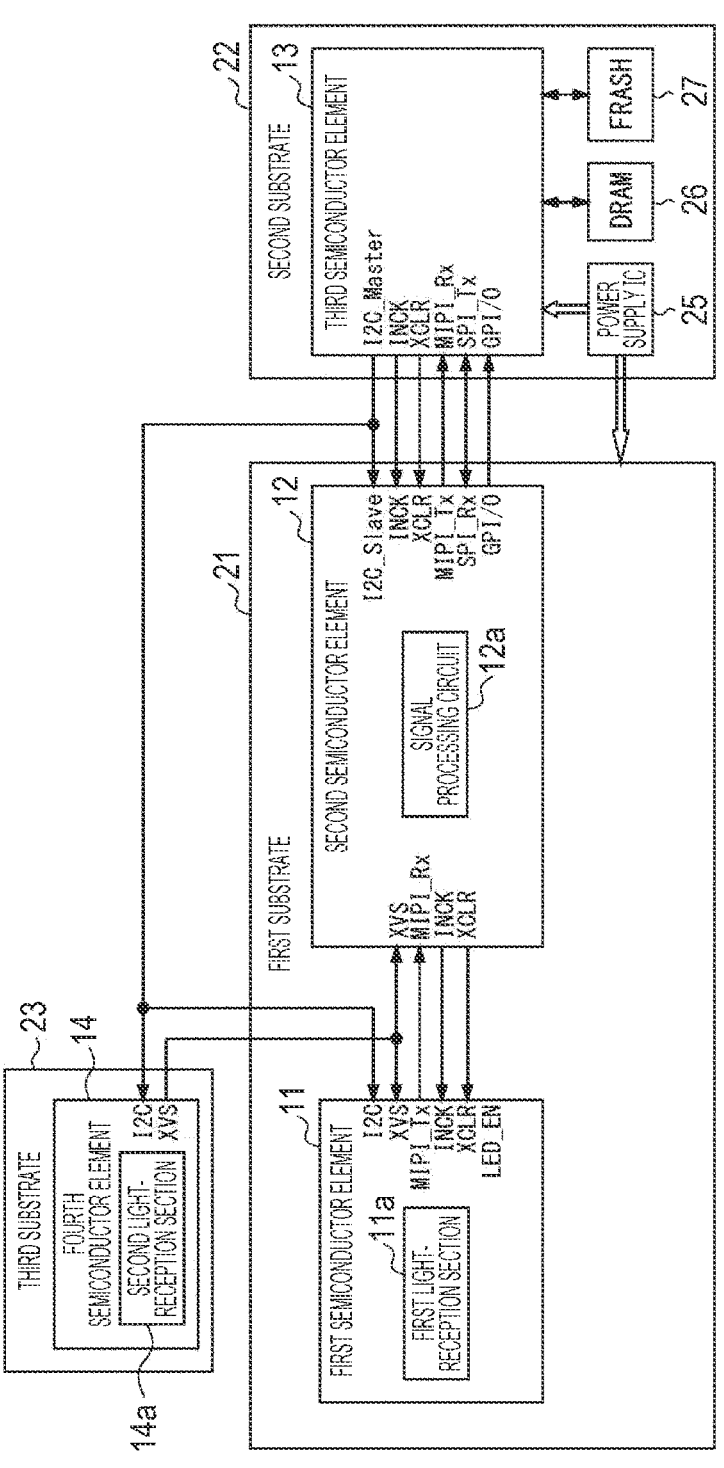
FIG. 1A is a block diagram showing a schematic configuration of a distance measurement device according to an embodiment.

Embodiments of a distance measurement device will be described below with reference to the drawings. Although main components of the distance measurement device will be mainly described below, the distance measurement device may include components and functions that are not shown in the drawings or described. The following description does not exclude components and functions that are not shown in the drawings or described.

FIG. 1A is a block diagram showing a schematic configuration of a distance measurement device 10 according to an embodiment. The distance measurement device 10 in FIG. 1A includes a first semiconductor element 11, a second semiconductor element 12, and a third semiconductor element 13.

The first semiconductor element 11 includes a first light-reception section 11a that receives light and performs photoelectric conversion to generate an electric signal. The first semiconductor element 11 may output a Phase signal of multiple phases in which a phase difference changes with the distance to an object, that is, a Phase signal of the indirect ToF method. Alternatively, the first semiconductor element 11 may output a signal indicating a time difference between a timing at which a light-emitting section as described later emits light and a timing at which the first light-reception section 11a receives light.

The second semiconductor element 12 includes a signal processing circuit 12a that performs signal processing including calculation of distance information regarding the distance to the object on the basis of the electric signal output from the first semiconductor element 11. The second semiconductor element 12 may also include a bypass path (bypass circuit) as described later that outputs the electric signal output from the first semiconductor element 11 without performing signal processing at the signal processing circuit 12a. For example, in a case where the processing capability of the second semiconductor element 12 is inferior to that of the third semiconductor element 13, and it is necessary to perform signal processing with excessively high processing load for the second semiconductor element 12, the electric signal output from the first semiconductor element 11 is transmitted to the third semiconductor element 13 through the bypass path. Therefore, the signal processing can be performed by the third semiconductor element 13, which has higher processing capability than the second semiconductor element 12, instead of the second semiconductor element 12.

The third semiconductor element 13 performs predetermined information processing on the basis of the distance information calculated by the second semiconductor element 12. The third semiconductor element 13 may have higher signal processing functionality than the signal processing circuit 12a in the second semiconductor element 12. A specific example of the third semiconductor element 13 is a high-performance application processor (AP) or a central processing unit (CPU).

The specific details of the information processing performed by the third semiconductor element 13 are arbitrary. For example, the third semiconductor element 13 may generate a distance image with colors and luminance varying with the distance to the object on the basis of the distance information calculated by the second semiconductor element 12. Alternatively, the third semiconductor element 13 may estimate gesture actions of the object on the basis of the distance information. Alternatively, the third semiconductor element 13 may generate a three-dimensional image on the basis of the distance information.

In the example of FIG. 1A, the first semiconductor element 11 and the second semiconductor element 12 are implemented on a common substrate (hereinafter, a first substrate 21), and the third semiconductor element 13 is implemented on a second substrate (second module) 22 arranged at a distance from the first substrate (first module) 21. The substrate configuration of FIG. 1A is an example, and the first semiconductor element 11, the second semiconductor element 12 and the third semiconductor element 13 may be implemented on a common substrate. Alternatively, the first semiconductor element 11 and the second semiconductor element 12 may be arranged on separate substrates.

As shown in FIG. 1A, in addition to the third semiconductor element 13, a power supply IC 25, a DRAM chip 26, a FRASH memory chip 27 and the like may be implemented on the second substrate 22. The DRAM chip 26 and the FRASH memory 27 may be provided inside the third semiconductor element 13 in some cases.

Although the distance measurement device 10 in FIG. 1A does not include a light-emitting section therein, a light-emitting section is needed for performing distance measurement using light, and the light-emitting section is provided separately from the distance measurement device 10 in FIG. 1A. The light-emitting section 15 is arranged near the first semiconductor element 11, for example. By arranging the light-emitting section 15 near the first semiconductor element 11, reflected light resulting from the reflection of the light emitted from the light-emitting section 15 at the object can be efficiently received by the light-reception section. By separating the distance measurement device 10 and the light-emitting section, a user can substitute or select a light-emitting section that emits light of a desired emission wavelength as necessary. However, a configuration in which the light-emitting section is arranged inside the distance measurement device is also possible.

Figure 1B:
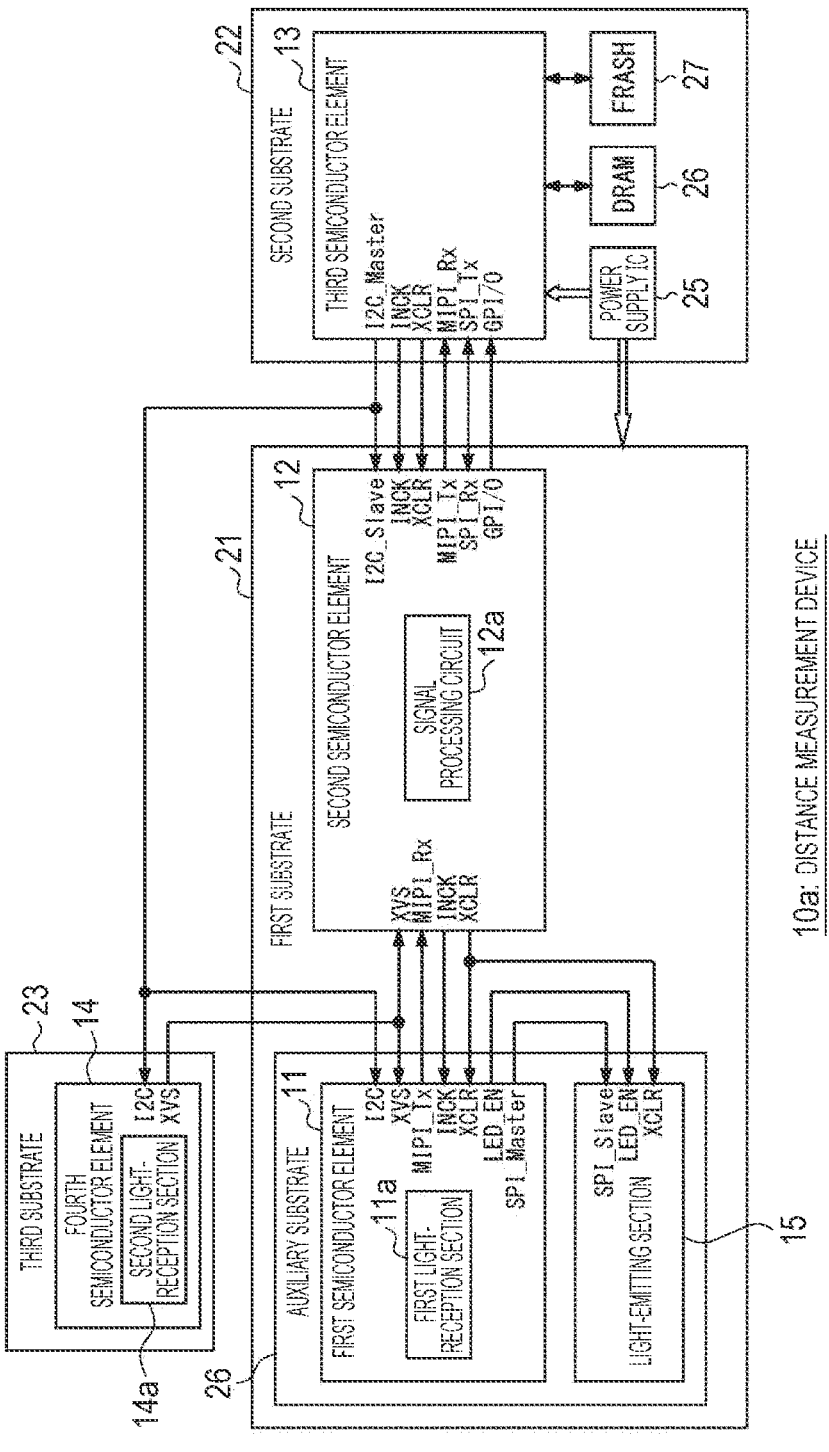
FIG. 1B is a block diagram showing a schematic configuration of a distance measurement device including a light-emitting section.

FIG. 1B is a block diagram showing a schematic configuration of a distance measurement device 10a including a light-emitting section 15. In the example of FIG. 1B, the light-emitting section 15 and the first semiconductor element 11 are arranged on the same auxiliary substrate 26, and the auxiliary substrate 26 is further implemented on the first substrate 21. The light-emitting section 15 and the first semiconductor element 11 are implemented on the auxiliary substrate 26. By implementing the auxiliary substrate 26 on the first substrate 21 as a ToF sensor module in this manner, the manufacturing of the distance measurement device 10B is facilitated.

The first semiconductor element 11 includes a communication unit (not shown) or the like, in addition to including the first light-reception section 11a therein. The first semiconductor element 11 has a plurality of input/output terminals. For example, the input/output terminals provided to the first semiconductor element 11 are an I2C terminal, an XVS terminal, an MIPI_Tx terminal, an INCK terminal, an XCLR terminal, an LED_EN terminal, an SPI_Master terminal and the like.

The I2C terminal is a terminal for receiving two signals for Inter-Integrated Circuit (I2C) communication from the third semiconductor element 13. One of the two signals is a clock signal, and the other is a serial signal. In the distance measurement devices 10, 10a of FIGS. 1A and 1B, the third semiconductor element 13 is a master of the I2C communication, and the first semiconductor element 11 and the second semiconductor element 12 are slaves. Thus, the first semiconductor element 11 and the second semiconductor element 12 perform transmission and reception of the serial signal according to a command from the third semiconductor element 13.

The XVS terminal is a terminal for receiving a synchronization signal. By receiving the synchronization signal at the XVS terminal, the first semiconductor element 11 can operate in synchronization with another semiconductor element (for example, a fourth semiconductor element 14) that transmits the synchronization signal. The XVS terminal performs transmission and reception of the synchronization signal in a case of synchronizing a plurality of semiconductor elements with each other. A specific example of the synchronization will be described later.

The MIPI_Tx terminal is a terminal compliant with the Mobile Industry Processor Interface (MIPI) standards and for transmitting the output signal of the first semiconductor element 11 (for example, a Phase signal of multiple phases).

The INCK terminal is a terminal for receiving an internal clock signal output from the second semiconductor element 12. The first semiconductor element 11 operates in synchronization with the internal clock signal. Therefore, the first semiconductor element 11 can operate in synchronization with the second semiconductor element 12.

The XCLR terminal is a terminal for receiving a clear signal output from the second semiconductor element 12. The clear signal is a signal for initializing the first semiconductor element 11.

The LED_EN terminal is a terminal for outputting an enable signal for putting the light-emitting section 15 into an enabled state. The SPI_Master terminal is a terminal for transmitting a serial signal from the first semiconductor element 11 as the master to the light-emitting section 15 as the slave via a Serial Peripheral Interface (SPI) bus.

The second semiconductor element 12 has an XVS terminal, an MIPI_Rx terminal, an INCK terminal, an XCLR terminal and the like as terminals for performing transmission and reception of various signals to/from the first semiconductor element 11.

The XVS terminal is a terminal for receiving a synchronization signal for synchronization with another semiconductor element, as described above.

The MIPI_Rx terminal is a terminal compliant with the MIPI standards and for receiving a Phase signal of multiple phases or the like, for example. The INCK terminal is a terminal for transmitting an internal clock signal to the first semiconductor element 11. The XCLR terminal is a terminal for transmitting a clear signal to the first semiconductor element 11.

Furthermore, the second semiconductor element 12 has an I2C Slave terminal, an INCK terminal, an XCLR terminal, an MIPI_Tx terminal, an SPI_Rx terminal, and a GPI/O terminal as terminals for performing transmission and reception of various signals to/from the third semiconductor element 13.

The I2C Slave terminal is a terminal for receiving two signals for I2C communication from the third semiconductor element 13. The INCK terminal is a terminal for receiving an internal clock signal from the third semiconductor element 13. The XCLR terminal is a terminal for receiving a clear signal from the third semiconductor element 13. The MIPI_Tx terminal is a terminal for transmitting distance information to the third semiconductor element 13 in the MIPI standards. The SPI_Rx terminal is a terminal for receiving a serial signal from the third semiconductor element 13 via an SPI bus. The GPI/O terminal is a terminal for transmitting various signals to the third semiconductor element 13 through a general I/O interface.

The third semiconductor element 13 has an I2C_Master terminal, an INCK terminal, an XCLR terminal, an MIPI_Rx terminal, an SPI_Tx terminal, and a GPI/O terminal.

The I2c_Master terminal is a terminal for transmitting two signals for I2C communication from the third semiconductor element 13 to the first semiconductor element 11 and the second semiconductor element 12.

The INCK terminal is a terminal for transmitting an internal clock signal to the second semiconductor element 12. The XCLR terminal is a terminal for transmitting a clear signal to the second semiconductor element 12. The MIP-I_Rx terminal is a terminal for receiving the distance information from the second semiconductor element 12 or the like in the MIPI standards. The SPI_Tx terminal is a terminal for transmitting a serial signal to the second semiconductor element 12 via an SPI bus. The GPI/O terminal is a terminal for receiving various signals from the second semiconductor element 12 through a general I/O interface.

The light-emitting section 15 has an SPI_Slave terminal, an LED_EN terminal, and an LDD_XCLR terminal. The SPI_Slave terminal is a terminal for receiving a serial signal from the first semiconductor element 11 as the master via an SPI bus. The LED_EN terminal is a terminal for receiving an enable signal from the first semiconductor element 11. When the enable signal is in a predetermined logic state, the light-emitting section 15 can emit light. The LDD_XCLR terminal is a terminal for receiving a clear signal from the second semiconductor element 12.

The distance measurement device 10, 10a according to the present embodiment may include a fourth semiconductor element 14, in addition to the first to third semiconductor elements 11 to 13, as shown in FIGS. 1A and 1B. The fourth semiconductor element 14 includes a second light-reception section 14a that receives light and performs photoelectric conversion to generate an electric signal.

The fourth semiconductor element 14 may be implemented on the first substrate 21 or the second substrate 22, or may be implemented on a third substrate 23 separate from the first substrate 21 and the second substrate 22. The electric signal output from the second light-reception section 14a in the fourth semiconductor element 14 is input to the third semiconductor element 13 without passing through the second semiconductor element 12. Therefore, the electric signal output from the second light-reception section 14a is subjected to various signal processing at the third semiconductor element 13. Alternatively, the electric signal output from the second light-reception section 14a in the fourth semiconductor element 14 may be input to the second semiconductor element 12 and subjected to signal processing at the second semiconductor element 12.

The electric signal output from the first light-reception section 11a in the first semiconductor element 11 and the electric signal output from the second light-reception section 14a in the fourth semiconductor element 14 may be synchronized or asynchronous. To synchronize both electric signals, it is possible to transmit a synchronization signal from the fourth semiconductor element 14 to the first semiconductor element 11 and the second semiconductor element 12 for synchronization, for example. In this case, the synchronization signal is output from the XVS terminal of the fourth semiconductor element 14 and input to the XVS terminals of the first semiconductor element 11 and the second semiconductor element 12. Note that, inversely, a synchronization signal may be transmitted from the first semiconductor element 11 to the second semiconductor element 12 and the fourth semiconductor element 14.

The wavelength band of light received by the first light-reception section 11a in the first semiconductor element 11 may be different from the wavelength band of light received by the second light-reception section 14a in the fourth semiconductor element 14. For example, the reception light band of the first light-reception section 11a in the first semiconductor element 11 may be 800 to 2000 nm, which is a wavelength band of infrared light, while the reception light band of the second light-reception section 14a in the fourth semiconductor element 14 may be 360 to 800 nm, which is a wavelength band of visible light.

Thus, the second light-reception section 14a in the fourth semiconductor element 14 may be an image sensor generally used in a camera or the like.

By synchronizing the electric signal output from the first light-reception section 11a and the electric signal output from the second light-reception section 14a, depth information can be added to at least some pixels in the captured image of visible light, and a three-dimensional image can be generated, for example.

The fourth semiconductor element 14 has an I2C terminal and an XVS terminal. The I2C terminal is a terminal for receiving two signals for I2C communication as described above from the third semiconductor element 13. The XVS terminal is a terminal for transmitting a synchronization signal.

Although the first light-reception section 11a in the first semiconductor element 11 and the second light-reception section 14a in the fourth semiconductor element 14 normally performs a light-reception operation in an asynchronous manner, the second light-reception section 14a in the fourth semiconductor element 14 transmits a synchronization signal via the XVS terminal in a case where there is a command for synchronization by I2C communication from the third semiconductor element 13. This synchronization signal is input to the XVS terminal of the first semiconductor element 11, and the first light-reception section 11a performs the light-reception operation in synchronization with the second light-reception section 14a and outputs a Phase signal. Therefore, the Phase signal is also synchronized with the synchronization signal. The Phase signal is input to the second semiconductor element 12 in compliance with the MIPI standards, and the synchronization signal is also input to the XVS terminal of the second semiconductor element 12. Therefore, the second semiconductor element 12 also performs signal processing in synchronization with the light-reception operation of the second light-reception element in the fourth semiconductor element 14 and generates distance information. The generated distance information is also synchronized with the light-reception operation of the second light-reception section 14a in the fourth semiconductor element 14.

The second light-reception section 14a in the fourth semiconductor element 14 updates image data at 60 frames per second, for example. Due to the synchronization by the synchronization signal described above, the second semiconductor element 12 can generate distance information in accordance with the timing of the image data output by the second light-reception section 14a. In order for the third semiconductor element 13 to generate a three-dimensional image, for example, it is necessary to synchronize the image data output by the second light-reception section 14a in the fourth semiconductor element 14 and the distance information output by the second semiconductor element 12, and in such a case, the third semiconductor element 13 instructs the fourth semiconductor element 14 to perform synchronization by I2C communication.

Figure 2:
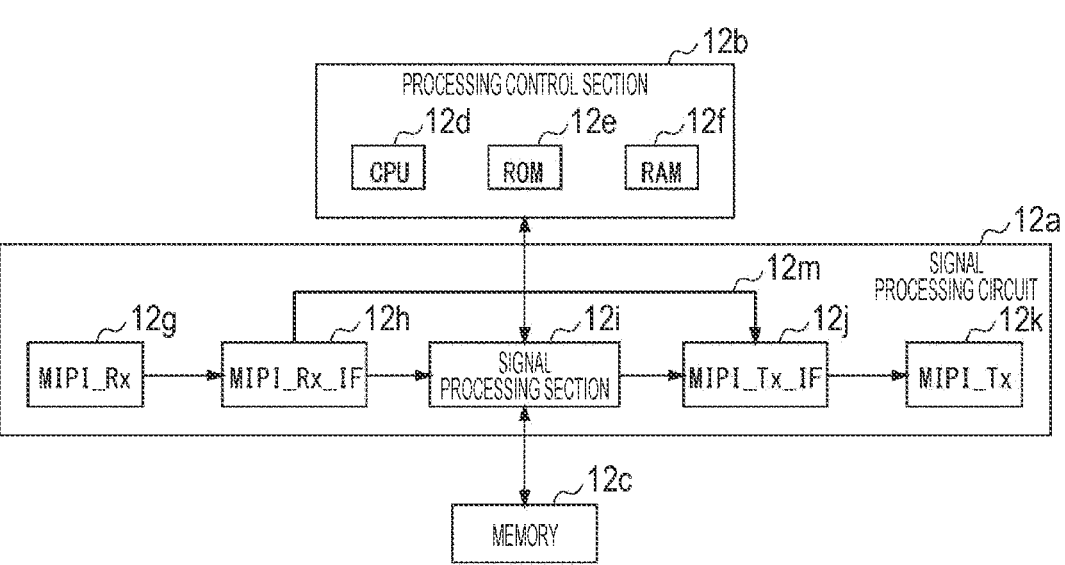
FIG. 2 is a block diagram showing an example of an internal configuration of a second semiconductor element in FIGS. 1A and 1B.

FIG. 2 is a block diagram showing an example of an internal configuration of the second semiconductor element 12 in FIGS. 1A and 1B. As shown in FIG. 2, the second semiconductor element 12 performs signal processing including calculation of distance information at the signal processing circuit 12a, which is hardware. Although the calculation of distance information is conventionally performed by software processing of a DSP, for example, the hardware implementation of the software processing that has been performed by the DSP allows the calculation of the distance information to be performed with high speed and low power consumption. The signal processing circuit 12a can be formed by a digital circuit using a logical operation gate, F/F and the like, and thus it is possible to reduce the power consumption and to easily perform the automation and optimization of design by using a logic synthesis tool or the like.

The second semiconductor element 12 shown in FIG. 2 includes a processing control circuit 12b and a memory 12c, in addition to the signal processing circuit 12a.

The processing control circuit 12b includes a CPU 12d, ROM 12e, RAM 12f and the like. A plurality of CPUs 12d may be used to perform parallel processing. The internal configuration of the processing control circuit 12b is arbitrary, and various variations are possible.

The signal processing circuit 12a includes MIPI_Rx 12g, MIPI_Rx_IF 12h, a signal processing section 12i, MIPI_Tx IF 12j, MIPI_Tx 12k, and a bypass path (bypass circuit) 12m.

The MIPI_Rx 12g receives a signal output from the first semiconductor element 11. More specifically, the MIPI_Rx 12g receives a Phase signal of the indirect ToF method or the like.

The MIPI_Rx_IF 12h switches between transmitting the signal output from the first semiconductor element 11 the signal processing section 12i and transmitting it to the bypass path 12m.

The signal processing section 12i performs noise processing, calibration processing, pre-processing, post-processing, interpolation processing, and the like. The signal processing circuit 12a may not only perform the processing of calculating the distance information from the Phase signal but also perform other general signal processing, for example, shading processing or the like.

The bypass path 12m is a signal path for allowing the signal output from the first semiconductor element 11 to be output from the second semiconductor element 12 without performing signal processing in the signal processing circuit 12a. The bypass path 12m is provided for causing the third semiconductor element 13 in a later stage to perform signal processing in a case where it is necessary to perform signal processing with excessive processing load for the signal processing circuit 12a, signal processing that results in insufficient performance with the signal processing circuit 12a, or the like, for example. A resistor, an inductor, a capacitor or the like may be connected on the bypass circuit 12m as necessary.

The MIPI_Tx12k_IF 12j selects one of the output signal of the signal processing section 12i and the output signal of the bypass path 12m. The selected signal is output from the second semiconductor element 12 via the MIPI_Tx 12k.

Figure 3:
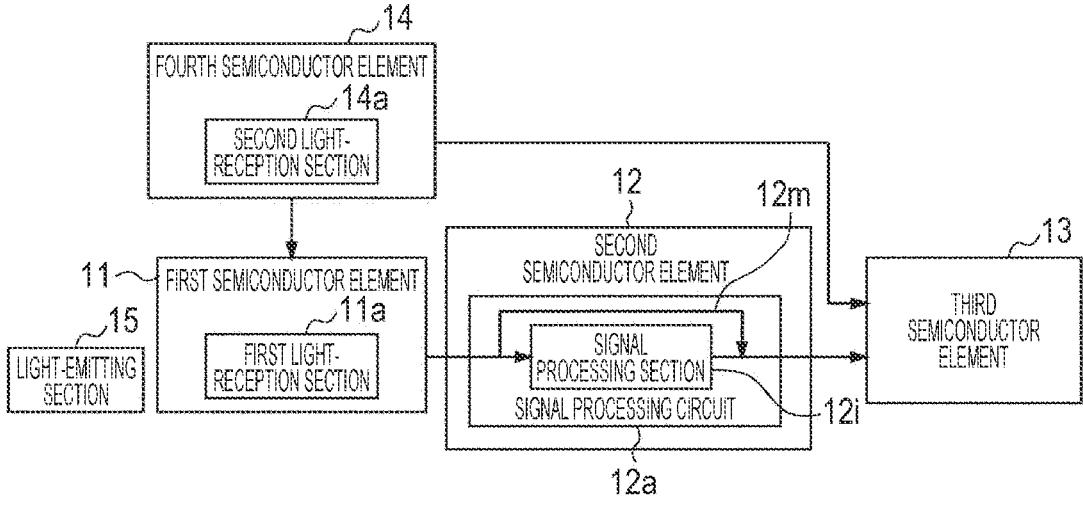
FIG. 3 is a block diagram showing a basic configuration of the distance measurement device according to the present embodiment.

FIG. 3 is a block diagram showing a basic configuration of the distance measurement device 10, 10a according to the present embodiment. As shown in FIG. 3, the distance measurement device 10, 10a according to the present embodiment includes, in the minimal configuration, the first semiconductor element 11 including the first light-reception section 11a, the second semiconductor element 12 including the signal processing circuit 12a, and the third semiconductor element 13. The third semiconductor element 13 is assumed to have higher signal processing capability than the second semiconductor element 12, and a high-performance AP or the CPU 12d is implemented, for example.

The signal processing circuit 12a performs signal processing including the calculation of the distance information, for example. The signal processing circuit 12a in the second semiconductor element 12 may be provided with the bypass path 12m as described above.

As an optional function, the light-emitting section 15 may be implemented in or connected to the first semiconductor element 11. Similarly, the distance measurement device 10, 10a according to the present embodiment may include the fourth semiconductor element 14 including the second light-reception section 14a as an optional function. In this case, the first light-reception section 11a and the second light-reception section 14a may perform the light-reception operation in synchronization with each other, or may perform the light-reception operation in an asynchronous manner.

Each semiconductor element in the distance measurement device 10, 10a performs master-slave communication by I2C communication. The third semiconductor device is a master, and the other semiconductor elements are slaves. The third semiconductor element 13 as a master transmits control signals to the other semiconductor elements. The first, second and fourth semiconductor elements 11, 12, 14 perform transmission and reception of various signals under control of the third semiconductor element 13.

Furthermore, the electric signals obtained by the light reception and photoelectric conversion by the first light-reception section 11a and the second light-reception section 14a are transmitted in compliance with the MIPI standards.

Figure 4A:
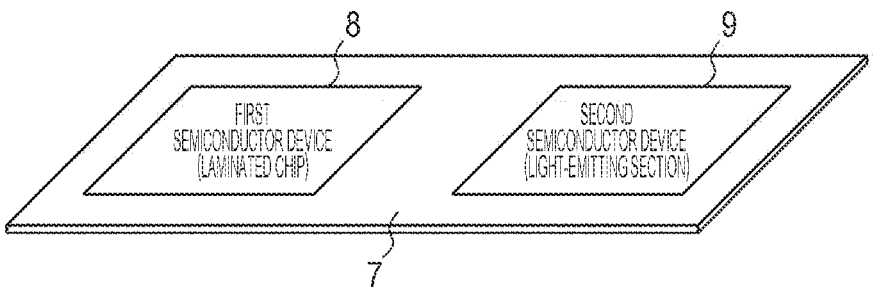
FIG. 4A is a diagram showing two semiconductor devices separately implemented on a substrate.

The distance measurement device 10 according to the present embodiment can be formed by a laminated chip. In the distance measurement device 10 the light-emitting section is usually provided separately from the distance measurement device 10 instead of being provided in the distance measurement device 10, as shown in FIG. 1A. In this case, as shown in FIG. 4A, it is possible to form it by two semiconductor devices (hereinafter, a first semiconductor device 8 and a second semiconductor device 9) separately implemented on the substrate 7. The first semiconductor device 8 is a laminated chip including the distance measurement device 10 shown in FIG. 1A. The second semiconductor device 9 is a chip including a light-emitting section.

Figure 4B:
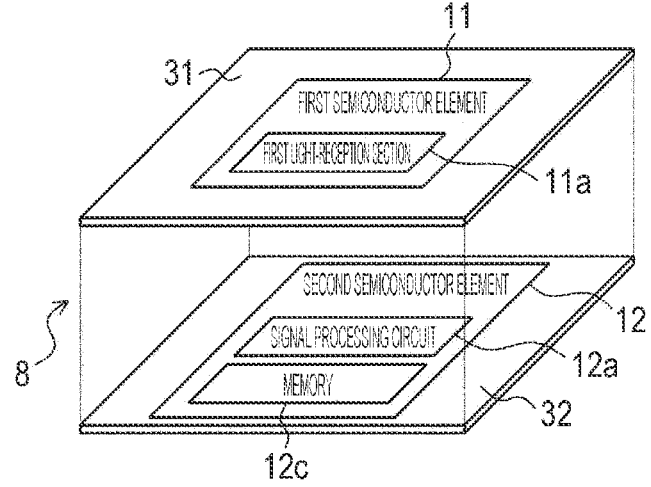
FIG. 4B is a diagram showing a first example of a laminated chip.

FIG. 4B is a diagram showing a first example of the laminated chip forming the first semiconductor device 8 in FIG. 4A, and has a bilayer structure of a first chip (first substrate) 31 and a second chip (second substrate) 32. The first semiconductor element 11 including the first light-reception section 11a is implemented on the first chip 31. The light-emitting section 15 may be implemented on the first chip 31.

The second semiconductor element 12 is implemented on the second chip 32. The memory 12c used by the second semiconductor element 12 may be implemented on the second chip 32. Although it is possible that the third semiconductor element 13 is implemented on a substrate separate from the first chip 31 and the second chip 32, the third semiconductor element 13 may also be implemented on the second chip 32. Alternatively, the third semiconductor element 13 may be laminated in a different layer than the first chip 31 and the second chip 32.

The first chip 31 and the second chip 32 are electrically connected via a connection such as a via, Cu—Cu bonding, or a bump. That is, the first chip 31 and the second chip 32 are laminated together by a Chip on Chip (CoC) method, a Chip on Wafer (CoW) method, or a Wafer on Wafer (WoW) method.

Figures 4C, 4D:
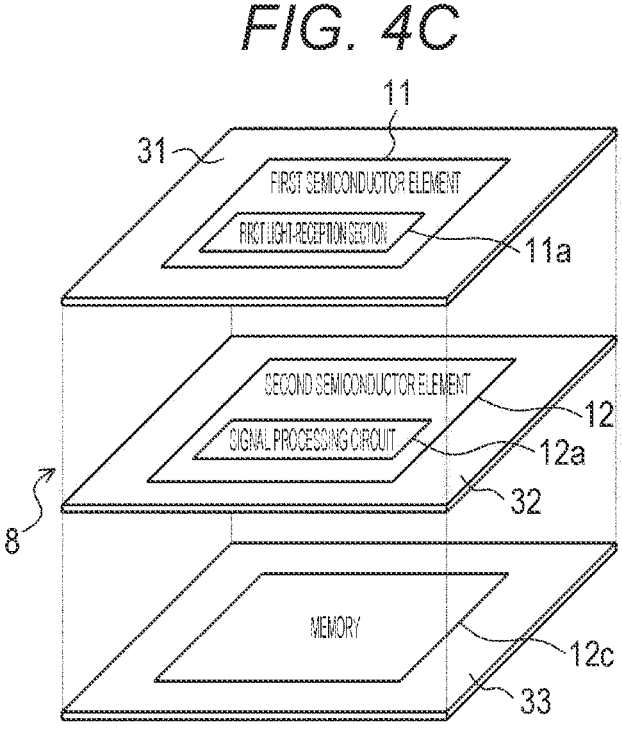
FIG. 4C is a diagram showing a second example of a laminated chip.
FIG. 4D is a diagram showing a third example of a laminated chip.

FIG. 4C is a diagram showing a second example of the laminated chip forming the first semiconductor device 8 in FIG. 4A. In FIG. 4C, a trilayer structure is formed by providing the memory 12c used by the second semiconductor element 12 in a different, third chip (third substrate) 33. FIG. 4C shows an example in which the third chip 33 is arranged below the second chip 32. The second chip 32 and the third chip 33 are connected by a via, Cu—Cu bonding, a bump or the like, as described above. The chip configuration in FIG. 4C is adopted such as in a case where the memory 12c has a large capacity and cannot be implemented in the second chip 32.

FIG. 4D is a diagram showing a third example of the laminated chip forming the first semiconductor device 8 in FIG. 4A. In FIG. 4D, the first semiconductor element 11 and the fourth semiconductor element 14 are implemented on the first chip 31. The second chip 32 is similar to that in FIG. 4B.

Figure 4E:
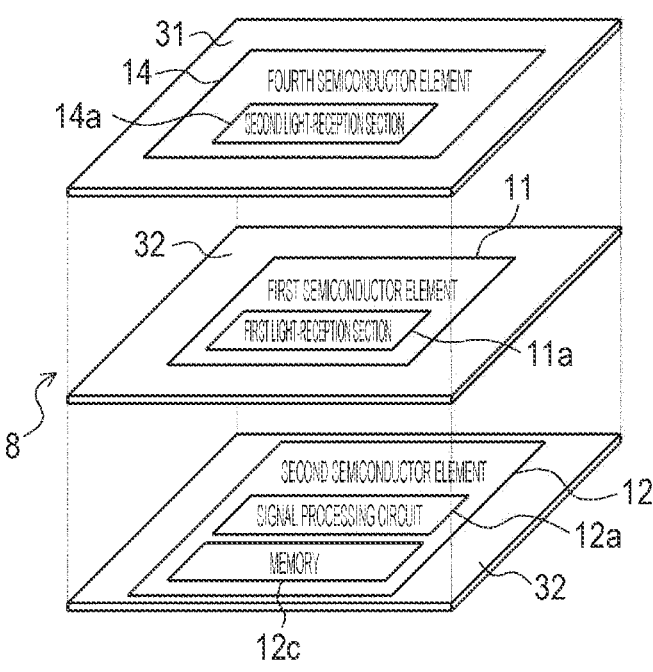
FIG. 4E is a diagram showing a fourth example of a laminated chip.

FIG. 4E is a diagram showing a fourth example of the laminated chip forming the first semiconductor device 8 in FIG. 4A. In FIG. 4E, a fourth chip (fourth substrate) 34 on which the fourth semiconductor element 14 including the second light-reception section 14a is implemented is provided separately from the first chip 31. The chip configuration in FIG. 4E is adopted such as in a case where the fourth semiconductor element 14 has a large footprint and it is difficult to provide it on the same chip as the first semiconductor element 11. Although the fourth chip 34 is laminated on the first chip 31 in FIG. 4E, the order of lamination may be inverse. The first chip 31 and the fourth chip 34 are connected by a via, Cu—Cu bonding, a bump or the like, as described above.

As a variation of FIG. 4E, the third chip 33 on which the memory 12c is implemented may be provided as in FIG. 4C. In this case, a structure in which four chips are laminated is formed.

Thus, in the present embodiment, since the second semiconductor element 12 including the signal processing circuit 12a, which performs signal processing by hardware such as calculating the distance information from the Phase signal of the indirect ToF method, is provided, it is possible to perform signal processing with higher speed and lower power consumption than performing signal processing by software processing.

Furthermore, since the bypass path 12m is provided in the second semiconductor element 12, for signal processing for which the processing performance of the signal processing circuit 12a in the second semiconductor element 12 is insufficient, it is possible to bypass the signal processing circuit 12a so that the signal processing is performed by the third semiconductor element 13 in a later stage. Therefore, it is possible to reduce the hardware cost of the distance measurement device 10, 10a without the necessity of improving the processing performance of the second semiconductor element 12 more than necessary.

(Example Configuration of Electronic Equipment)

Figure 5:
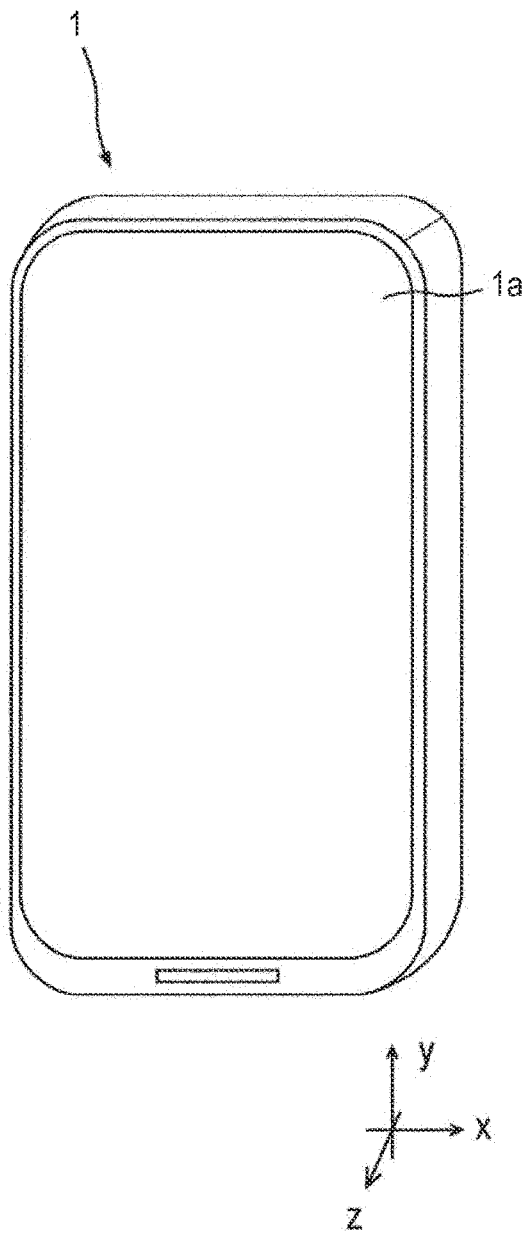
FIG. 5 is a diagram showing an example of electronic equipment according to the present disclosure.
Figure 6:
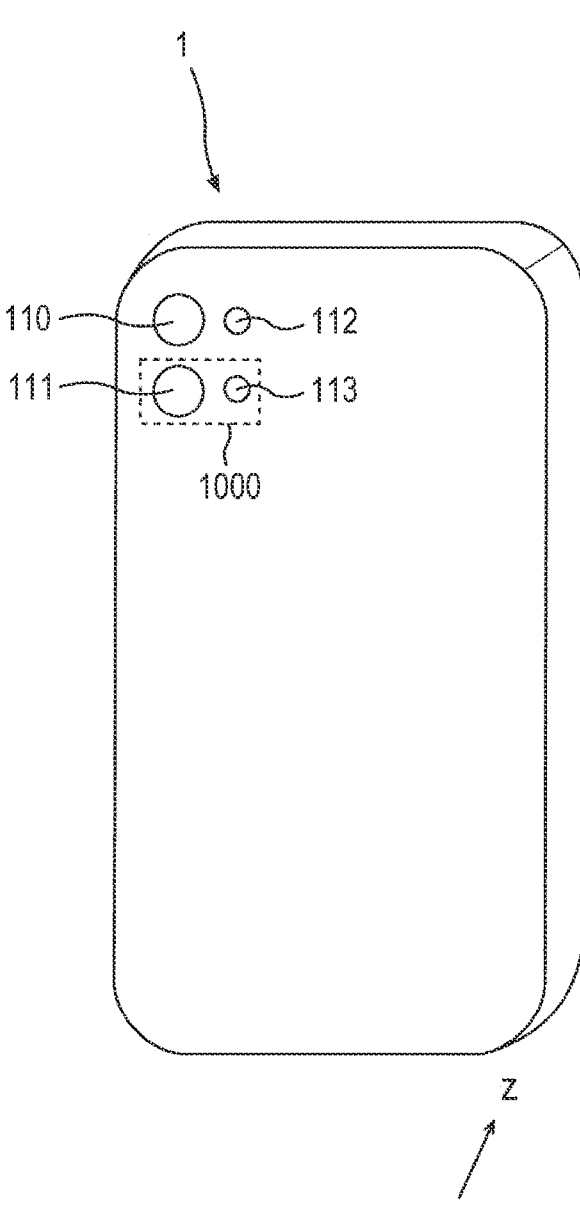
FIG. 6 is a diagram showing an example of electronic equipment according to the present disclosure.

FIGS. 5 and 6 show an example of electronic equipment provided with the distance measurement device 10, 10a according to the present disclosure. FIG. 5 shows a configuration of electronic equipment 1 as viewed from the positive side of the z-axis. On the other hand, FIG. 6 shows a configuration of the electronic equipment 1 as viewed from the negative side of the z-axis. The electronic equipment 1 has a substantially flat plate shape, for example, and includes a display section 1a on at least one surface (herein, the surface at the positive side of the z-axis). The display section 1a can display images by liquid crystal, micro LED, or organic electroluminescence, for example. However, the display manner of the display section 1a is not limited. Furthermore, the display section 1a may also include a touch panel and a fingerprint sensor.

On a surface of the electronic equipment 1 at the negative side of the z-axis, a first image-capturing section 110, a second image-capturing section 111, a first light-emitting section 112, and a second light-emitting section 113 are implemented. For example, the first image-capturing section 110 is a camera module capable of capturing color images. For example, the camera module includes a lens system and an image-capturing device that performs photoelectric conversion of light collected by the lens system. For example, the first light-emitting section 112 is a light source used as a flash unit of the first image-capturing section 110. For example, a white LED can be used as the first light-emitting section 112. However, the type of the light source used as the first light-emitting section 112 is not limited.

For example, the second image-capturing section 111 is an image-capturing device capable of performing distance measurement by the indirect ToF method. For example, the image-capturing device according to the present disclosure can be implemented as the second image-capturing section 111. For example, the second image-capturing section 111 corresponds to the first light-reception section 11a in FIG. 1B. The second light-emitting section 113 is a light source that can be used for distance measurement by the indirect ToF method. For example, the second light-emitting section 113 corresponds to the light-emitting section 15 in FIG. 1B. That is, the distance measurement device 10a in FIG. 1B may be implemented in the electronic equipment 1. The electronic equipment 1 can perform various processing on the basis of the distance image output from the distance measurement device 10a.

A case where the electronic equipment according to the present disclosure is a smartphone or a tablet has been described herein. However, the electronic equipment according to the present disclosure may also be another type of device such as a game machine, in-vehicle equipment, a PC, or a surveillance camera, for example.

The distance measurement device 10, 10a according to the present disclosure may include a signal generator, a plurality of flip-flops connected in cascade, a circuit block, a pixel array, and a signal processing section. The signal generator is configured to generate a clock signal. The circuit block is configured to supply a first signal to respective clock terminals of the plurality of flip-flops according to the clock signal and supply a second signal to an input terminal of a first-stage flip-flop of the plurality of flip-flops. The pixel array includes pixels configured to be driven by pulse signals supplied from different stages of the plurality of flip-flops. The signal processing section is configured to generate a distance image on the basis of charges generated by photoelectric conversion in the pixels of the pixel array.

The electronic equipment according to the present disclosure may include a signal generator, a plurality of flip-flops connected in cascade, a circuit block, and a pixel array. The signal generator is configured to generate a clock signal. The circuit block is configured to supply a first signal to respective clock terminals of the plurality of flip-flops according to the clock signal and supply a second signal to an input terminal of a first-stage flip-flop of the plurality of flip-flops. The pixel array includes pixels configured to be driven by pulse signals supplied from different stages of the plurality of flip-flops.

(Example Application to Mobile Body)

The technology according to the present disclosure (the present technology) can be applied to various products. For example, the technology according to the present disclosure may be realized by a device provided to any type of mobile body such as an automobile, an electric vehicle, a hybrid electric vehicle, a motorcycle, a bicycle, a personal mobility vehicle, an airplane, a drone, a ship, or a robot.

Figure 7:
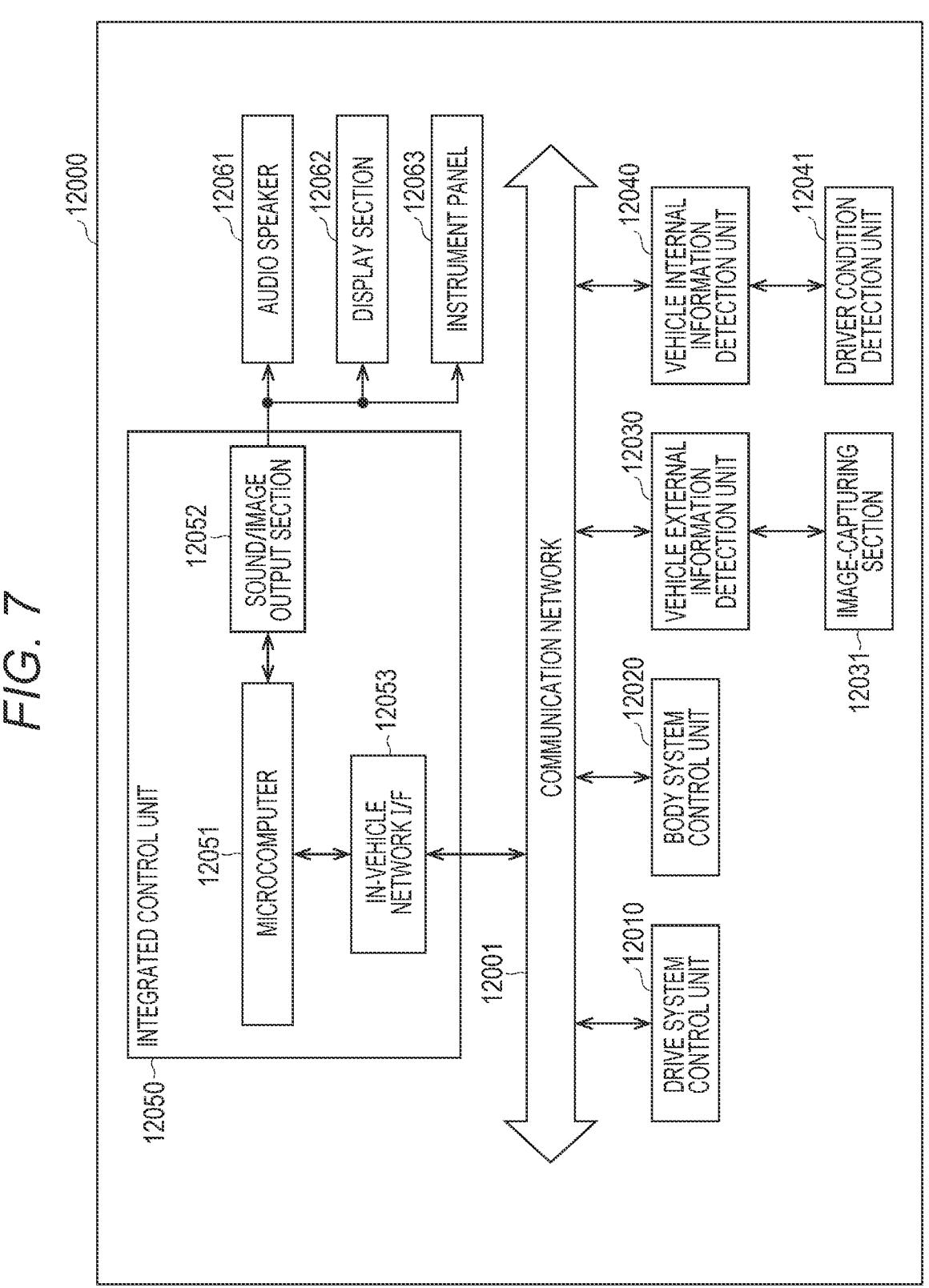
FIG. 7 is a block diagram showing an example of a schematic configuration of a vehicle control system.

FIG. 7 is a block diagram showing an example schematic configuration of a vehicle control system as an example of a mobile body control system to which the technology according to the present disclosure can be applied.

A vehicle control system 12000 includes a plurality of electronic control units connected via a communication network 12001. In the example shown in FIG. 7, the vehicle control system 12000 includes a drive system control unit 12010, a body system control unit 12020, a vehicle external information detection unit 12030, a vehicle internal information detection unit 12040, and an integrated control unit 12050. Furthermore, as functional components of the integrated control unit 12050, a microcomputer 12051, a sound/ image output section 12052, and an in-vehicle network interface (I/F) 12053 are shown in the figure.

The drive system control unit 12010 controls the operation of devices related to the drive system of the vehicle according to various programs. For example, the drive system control unit 12010 functions as a control device for a driving force generation device for generating driving force of the vehicle such as an internal combustion engine or a driving motor, a driving force transmission mechanism for transmitting the driving force to the wheels, a steering mechanism for adjusting the steering angle of the vehicle, a braking device for generating braking force of the vehicle, and the like.

The body system control unit 12020 controls the operation of various devices provided to the vehicle body according to various programs. For example, the body system control unit 12020 functions as a control device for a keyless entry system, a smart key system, a power window device, or various lamps such as a headlamp, a backup lamp, a stop lamp, a blinker, or a fog lamp. In this case, radio waves emitted from mobile device substituting a key or signals from various switches can be input to the body system control unit 12020. The body system control unit 12020 receives the input of the radio waves or signals and controls the door locking device, power window device, lamps, and the like of the vehicle.

The vehicle external information detection unit 12030 detects information external to the vehicle provided with the vehicle control system 12000. For example, an image-capturing section 12031 is connected to the vehicle external information detection unit 12030. The vehicle external information detection unit 12030 causes the image-capturing section 12031 to capture an image of the space external to the vehicle and receives the captured image. The vehicle external information detection unit 12030 may perform object detection processing or distance detection processing on a person, vehicle, obstacle, sign, characters on the road surface, or the like on the basis of the received image.

The image-capturing section 12031 is an optical sensor that receives light and outputs an electric signal corresponding to the amount of light received. The image-capturing section 12031 can output the electric signal as an image or as distance measurement information. Furthermore, the light received by the image-capturing section 12031 may be visible light or may be non-visible light such as infrared light.

The vehicle internal information detection unit 12040 detects information about the interior of the vehicle. For example, a driver condition detection section 12041 for detecting the conditions of the driver is connected to the vehicle internal information detection unit 12040. The driver condition detection section 12041 includes a camera for capturing an image of the driver, for example, and the vehicle internal information detection unit 12040 may calculate the degree of fatigue or the degree of concentration of the driver on the basis of detection information input from the driver condition detection section 12041, or may determine whether the driver is dozing.

The microcomputer 12051 can compute a control target value for the driving force generation device, the steering mechanism, or the braking device on the basis of the information about the interior or exterior of the vehicle acquired by the vehicle external information detection unit 12030 or the vehicle internal information detection unit 12040 and output a control command to the drive system control unit 12010. For example, the microcomputer 12051 can perform cooperative control for the purpose of realizing the function of the Advanced Driver Assistance System (ADAS) including collision avoidance or shock mitigation for the vehicle, follow-up driving based on the following distance, vehicle speed maintaining driving, collision alert for the vehicle, lane deviation alert for the vehicle, or the like.

Furthermore, the microcomputer 12051 can perform cooperative control for the purpose of automated driving or the like for autonomously traveling without relying on operations of the driver by controlling the driving force generation device, the steering mechanism, the braking device, or the like on the basis of information about the surroundings of the vehicle acquired by the vehicle external information detection unit 12030 or the vehicle internal information detection unit 12040.

Furthermore, the microcomputer 12051 can output a control command to the body system control unit 12020 on the basis of the information about the exterior of the vehicle acquired by the vehicle external information detection unit 12030. For example, the microcomputer 12051 can perform cooperative control for the purpose of glare reduction such as controlling the headlamp according to the position of a leading vehicle or an oncoming vehicle detected by the vehicle external information detection unit 12030 to switch high beam to low beam.

The sound/image output section 12052 transmits an output signal of at least one of a sound and an image to an output device capable of visually or auditorily notifying an occupant of the vehicle or the external of the vehicle of information. In the example of FIG. 7, an audio speaker 12061, a display section 12062, and an instrument panel 12063 are illustrated as output devices. The display section 12062 may include at least one of an onboard display and a head-up display, for example.

Figure 8:
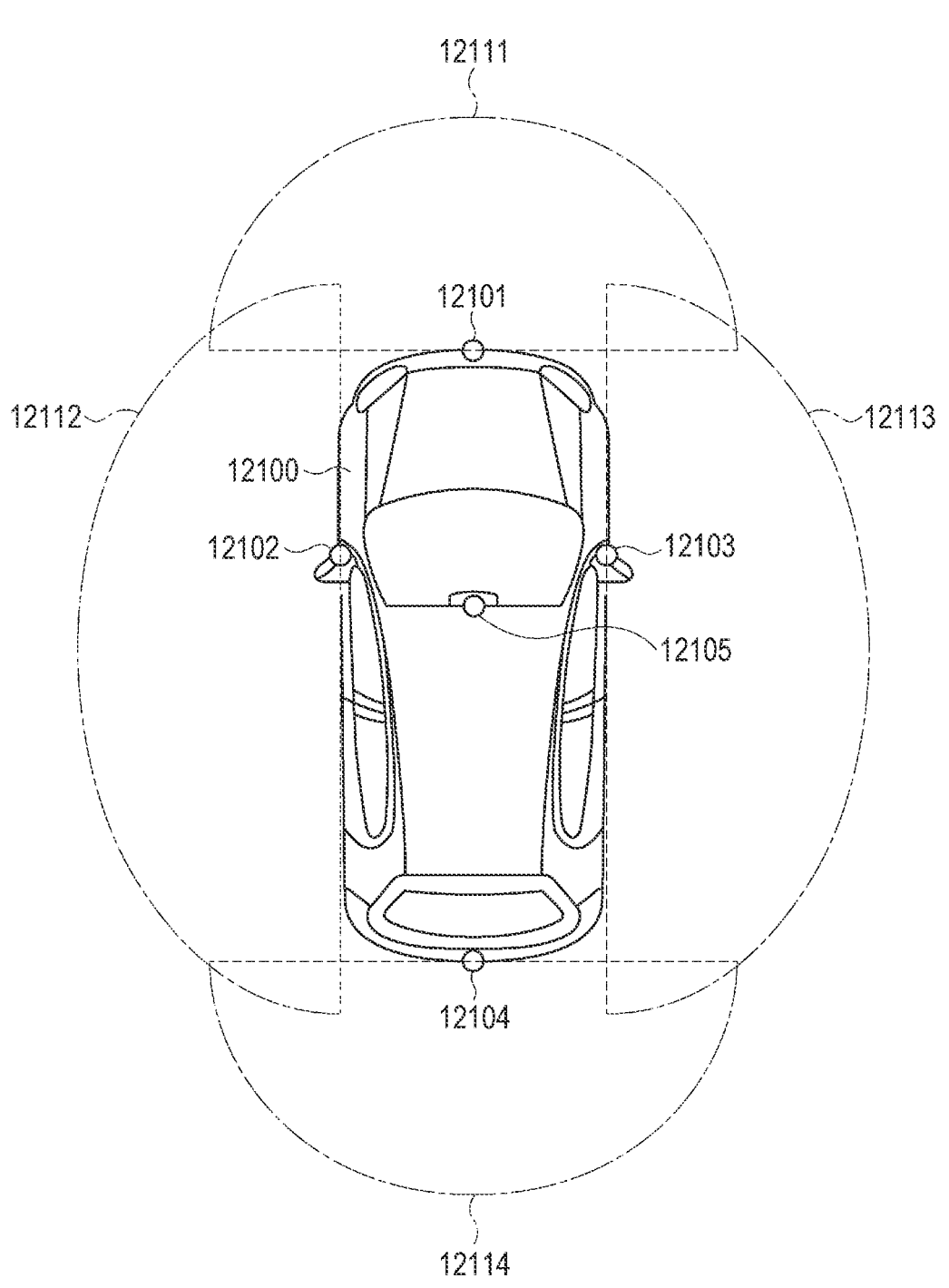
FIG. 8 is an illustrative diagram showing an example of installation positions of a vehicle external information detection section and image-capturing sections.

FIG. 8 is a diagram showing an example of installation positions of the image-capturing section 12031.

In FIG. 8, a vehicle 12100 includes image-capturing sections 12101, 12102, 12103, 12104, 12105 as the image-capturing section 12031.

For example, the image-capturing sections 12101, 12102, 12103, 12104, 12105 are provided at positions such as a front nose, a door mirror, a rear bumper, a back door, and the upper portion of a windshield inside the cabin, of the vehicle 12100. The image-capturing section 12101 provided at the front nose and the image-capturing section 12105 provided at the upper portion of the windshield inside the cabin mainly acquire images of the space in front of the vehicle 12100. The image-capturing sections 12102, 12103 provided at the door mirrors mainly acquire images of the space at the sides of the vehicle 12100. The image-capturing section 12104 provided at the rear bumper or the back door mainly acquires an image of the space in the rear of the vehicle 12100. The images of the front space acquired by the image-capturing sections 12101 and 12105 are mainly used for detection of a leading vehicle or a pedestrian, an obstacle, a traffic signal, a traffic sign, a lane, or the like.

Note that FIG. 8 shows an example of image-capturing areas of the image-capturing sections 12101 to 12104. An image-capturing area 12111 indicates the image-capturing area of the image-capturing section 12101 provided at the front nose, an image-capturing areas 12112, 12113 indicate the image-capturing areas of the image-capturing sections 12102, 12103 provided at the door mirrors, respectively, and an image-capturing area 12114 indicates the image-capturing area of the image-capturing section 12104 provided at the rear bumper or the back door. For example, pieces of image data captured by the image-capturing sections 12101 to 12104 are overlaid to obtain a look-down image of the vehicle 12100 as viewed from above.

At least one of the image-capturing sections 12101 to 12104 may have a function of acquiring distance information. For example, at least one of the image-capturing sections 12101 to 12104 may be a stereo camera including a plurality of image-capturing devices, or may be an image-capturing device having pixels for phase difference detection.

For example, the microcomputer 12051 can extract, as a leading vehicle, a three-dimensional object that in particular is closest on the road on which the vehicle 12100 travels and is traveling in substantially the same direction as the vehicle 12100 at a predetermined speed (for example, 0 km/h or more) by calculating the distance to each three-dimensional object in the image-capturing areas 12111 to 12114 and a temporal change of the distance (a relative speed to the vehicle 12100) on the basis of the distance information obtained from the image-capturing sections 12101 to 12104. Moreover, the microcomputer 12051 can set a following distance to be kept in advance in front of a leading vehicle and perform automatic brake control (including following stop control), automatic acceleration control (including following start control), and the like. Thus, it is possible to perform cooperative control for the purpose of automated driving or the like for autonomously traveling without relying on operations of the driver.

For example, the microcomputer 12051 can classify and extract three-dimensional object data relating to three-dimensional objects into a two-wheeled vehicle, a standard vehicle, a large vehicle, a pedestrian, and other three-dimensional objects such as a telegraph pole on the basis of the distance information obtained from the image-capturing sections 12101 to 12104, and use them for automatic obstacle avoidance. For example, the microcomputer 12051 divides obstacles around the vehicle 12100 into obstacles that can be visually recognized by the driver of the vehicle 12100 and obstacles that are difficult to visually recognize. The microcomputer 12051 can then determine a collision risk indicating the degree of risk of collision with each obstacle and, in a case where the collision risk is greater than or equal to a set value and collision is possible, perform driving assistance for collision avoidance by outputting an alarm to the driver via the audio speaker 12061 or the display section 12062 or by performing forced deceleration or avoidance steering via the drive system control unit 12010.

At least one of the image-capturing sections 12101 to 12104 may be an infrared camera that detects infrared light. For example, the microcomputer 12051 can recognize a pedestrian by determining whether or not a pedestrian is present in the captured images of the image-capturing sections 12101 to 12104. For example, the recognition of a pedestrian is performed by a procedure of extracting feature points in the captured images of the image-capturing section 12101 to 12104 as infrared cameras and a procedure of performing pattern matching processing on a series of feature points indicating the contour of an object and discriminating whether or not it is a pedestrian. In a case where the microcomputer 12051 determines that a pedestrian is present in the captured images of the image-capturing sections 12101 to 12104 and recognizes the pedestrian, the sound/image output section 12052 controls the display section 12062 to display a rectangular contour line for highlight superimposed on the recognized pedestrian. Furthermore, the sound/image output section 12052 may control the display section 12062 to display an icon or the like indicating the pedestrian at a desired position.

An example of the vehicle control system to which the technology according to the present disclosure can be applied has been described above. The technology according to the present disclosure can be applied to the image-capturing section 12031, for example, among the components described above. Specifically, the image-capturing device according to the present disclosure can be implemented in the image-capturing section 12031. By applying the technology according to the present disclosure to the image-capturing section 12031, it is possible to improve the resolution of the distance image while suppressing the generation of electromagnetic noise and to enhance the functionality and safety of the vehicle 12100.

Note that the present technology can assume the following configurations.

(1) A distance measurement device including:

a first semiconductor element including a first light-reception section that receives light and performs photoelectric conversion to generate an electric signal;

a second semiconductor element including a distance calculation section that performs calculation of distance information regarding a distance to an object on the basis of the electric signal; and a third semiconductor element including a signal processing section that performs predetermined information processing on the basis of an output signal of the distance calculation section.

(2) The distance measurement device according to (1), in which the second semiconductor element includes a bypass circuit, and the signal processing section performs the information processing on the electric signal output via the bypass circuit.

(3) The distance measurement device according to (2), in which the bypass circuit outputs the electric signal output from the first semiconductor element without performing processing at the distance calculation section.

(4) The distance measurement device according to any one of (1) to (3), in which the first semiconductor element outputs the electric signal of multiple phases in which a phase difference changes with the distance to the object, and the distance calculation section calculates the distance information on the basis of the electric signal of the multiple phases.

(5) The distance measurement device according to any one of (1) to (3), in which the distance calculation section calculates the distance information from a time difference between a timing at which a light-emitting section emits light and a timing at which the first light-reception section receives light.

(6) The distance measurement device according to any one of (1) to (5), further including a light-emitting section that emits light in response to control from the first light-reception section.

(7) The distance measurement device according to (6), in which the first semiconductor element and the light-emitting section are implemented on a same substrate.

(8) The distance measurement device according to any one of (1) to (7), further including:

a first substrate on which the first semiconductor element is implemented; and a second substrate on which the second semiconductor element is implemented, in which the first substrate and the second substrate are laminated on each other.

(9) The distance measurement device according to (8), in which the first substrate and the second substrate are laminated together by a Chip on Chip (CoC) method, a Chip on Wafer (CoW) method, or a Wafer on Wafer (WoW) method.

(10) The distance measurement device according to (8) or (9), further including a memory implemented on the second substrate and used by the distance calculation section for performing the calculation of the distance information.

(11) The distance measurement device according to (8) or (9), further including a third substrate on which a memory used by the distance calculation section for performing the calculation of the distance information is implemented, in which the first substrate, the second substrate, and the third substrate are laminated in a predetermined order.

(12) The distance measurement device according to (10) or (11), in which the memory includes a volatile memory or a rewritable non-volatile memory.

(13) The distance measurement device according to any one of (1) to (12), in which the distance calculation section includes a digital circuit that performs digital signal processing on the electric signal including the calculation of the distance information.

(14) The distance measurement device according to any one of (1) to (13), further including a fourth semiconductor element including a second light-reception section that receives light and performs photoelectric conversion to generate an electric signal.

(15) The distance measurement device according to (14), in which an electric signal output from the second light-reception section is input to the third semiconductor element without passing through the second semiconductor element.

(16) The distance measurement device according to (14) or (15), in which the third semiconductor element controls whether or not to synchronize an electric signal output from the first light-reception section and an electric signal output from the second light-reception section.

(17) The distance measurement device according to (16), in which the fourth semiconductor element transmits, to the first semiconductor element and the second semiconductor element, a synchronization signal synchronized with an electric signal output from the second light-reception section.

(18) The distance measurement device according to any one of (14) to (17), in which the first light-reception section and the second light-reception section receive light of respective different wavelength bands.

The aspects of the present disclosure are not limited to the individual embodiments described above and include various modifications that can be conceived by those skilled in the art, and also the effects of the present disclosure are not limited to those described above. In other words, various additions, modifications, and partial deletions are possible without departing from the conceptual idea and spirit of the present disclosure derived from the definitions of the claims and their equivalents.

REFERENCE SIGNS LIST

1 Electronic equipment
10 Distance measurement device
11 First semiconductor element
12 Second semiconductor element
13 Third semiconductor element
21 First substrate
22 Second substrate
23 Third substrate
25 Power supply IC
26 DRAM chip
27 FRASH memory chip
31 First chip
32 Second chip
33 Third chip
34 Fourth chip
110 First image-capturing section
111 Second image-capturing section
112 First light-emitting section
113 Second light-emitting section

The invention claimed is:

1. A distance measurement device, comprising:

a first semiconductor element including a first light-reception section configured to receive light and execute a first photoelectric conversion operation to generate a first electric signal;

a second semiconductor element including a distance calculation section configured to execute calculation of distance information regarding a distance to an object based on the first electric signal, and a bypass circuit configured to output the first electric signal output from the first semiconductor element without execution of a signal processing operation at the distance calculation section; and a third semiconductor element including a signal processing section configured to execute a specific information processing operation based on the electric signal output via the bypass circuit.

2. The distance measurement device according to claim 1, wherein the first semiconductor element is further configured to output the first electric signal of multiple phases in which a phase difference changes with the distance to the object, and the distance calculation section is further configured to calculate the distance information on a basis of the first electric signal of the multiple phases.

3. The distance measurement device according to claim 1, wherein the distance calculation section is further configured to calculate the distance information from a time difference between a timing at which a light-emitting section emits light and a timing at which the first light-reception section receives light.

4. The distance measurement device according to claim 1, further comprising a light-emitting section configured to emit light in response to control from the first light-reception section.

5. The distance measurement device according to claim 4, wherein the first semiconductor element and the light-emitting section are implemented on a same substrate.

6. The distance measurement device according to claim 1, further comprising:

a first substrate on which the first semiconductor element is implemented; and a second substrate on which the second semiconductor element is implemented, wherein the first substrate is laminated on the second substrate.

7. The distance measurement device according to claim 6, wherein the first substrate and the second substrate are laminated together by a Chip on Chip (CoC) method, a Chip on Wafer (CoW) method, or a Wafer on Wafer (WoW) method.

8. The distance measurement device according to claim 6, further comprising a memory implemented on the second substrate and utilized by the distance calculation section to execute the calculation of the distance information.

9. The distance measurement device according to claim 6, further comprising a third substrate on which a memory utilized by the distance calculation section to execute the calculation of the distance information is implemented, wherein the first substrate, the second substrate, and the third substrate are laminated in a specific order.

10. The distance measurement device according to claim 8, wherein the memory comprises a volatile memory or a rewritable non-volatile memory.

11. The distance measurement device according to claim 1, wherein the distance calculation section includes a digital circuit configured to a digital signal processing operation on the first electric signal including the calculation of the distance information.

12. The distance measurement device according to claim 1, further comprising a fourth semiconductor element including a second light-reception section configured to receive the light and execute a second photoelectric conversion operation to generate a second electric signal.

13. The distance measurement device according to claim 12, wherein the second electric signal output from the second light-reception section is input to the third semiconductor element without passing through the second semiconductor element.

14. The distance measurement device according to claim 12, wherein the third semiconductor element is further configured to control whether or not to synchronize the first electric signal output from the first light-reception section and the second electric signal output from the second light-reception section.

15. The distance measurement device according to claim 14, wherein the fourth semiconductor element is further configured to transmit, to the first semiconductor element and the second semiconductor element, a synchronization signal synchronized with the second electric signal output from the second light-reception section.

16. The distance measurement device according to claim 12, wherein the first light-reception section and the second light-reception section receive light of respective different wavelength bands.

17. The distance measurement device according to claim 1, wherein the second semiconductor element further includes an interface circuit configured to switch supply of the first electric signal between the distance calculation section and the bypass circuit.

\* \* \* \* \*